United States Patent
Sakamoto et al.

(10) Patent No.: US 7,369,768 B2
(45) Date of Patent: May 6, 2008

(54) OPTICAL ACCESS SYSTEM

(75) Inventors: Kenichi Sakamoto, Kokubunji (JP); Yoshihiro Ashi, Yokohama (JP); Tohru Kazawa, Kokubunji (JP); Ryosuke Nishino, Yokohama (JP); Masayuki Takase, Kokubunji (JP); Masahiko Mizutani, Kokubunji (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 80 days.

(21) Appl. No.: 11/346,467

(22) Filed: Feb. 3, 2006

(65) Prior Publication Data
US 2007/0025735 A1    Feb. 1, 2007

(30) Foreign Application Priority Data
Jul. 29, 2005   (JP) ............................. 2005-219907

(51) Int. Cl.
*H04B 10/00* (2006.01)
(52) U.S. Cl. ............................. 398/58; 398/67; 398/72
(58) Field of Classification Search ............ 398/58–73
See application file for complete search history.

(56) References Cited

U.S. PATENT DOCUMENTS

| | | | |
|---|---|---|---|
| 6,697,374 B1 * | 2/2004 | Shraga et al. | 370/458 |
| 2003/0091045 A1 | 5/2003 | Choi et al. | |
| 2003/0142626 A1 | 7/2003 | Umayabashi et al. | |
| 2004/0202470 A1 * | 10/2004 | Lim et al. | 398/51 |

FOREIGN PATENT DOCUMENTS

| | | |
|---|---|---|
| JP | 10-93607 | 9/1996 |
| JP | 11-122279 | 10/1997 |
| JP | 2002-198984 | 12/2000 |
| JP | 2003-224572 | 1/2002 |

(Continued)

OTHER PUBLICATIONS

"A Broadband Optical Access System with Increased Service Capability Using Dynamic Bandwidth Assignment", Series G: Transmission Systems and Media, Digital Systems and Networks, International Telecommunication Union (Nov. 2001), 2 cover pages, pp. i-v, and 1-82.

(Continued)

*Primary Examiner*—Agustin Bello
(74) *Attorney, Agent, or Firm*—Reed Smith LLP; Stanley P. Fisher, Esq.; Juan Carlos A. Marquez, Esq.

(57) ABSTRACT

An optical access system capable of avoiding cutoffs or interruption in the periodically transmitted signals that occur during the ranging time is provided. A first method to avoid signal cutoffs is to stop periodic transmit signals at the transmitter during the ranging period, and transmit all the periodic transmit signals together when the ranging ends, and buffer the signals at the receiver to prepare for ranging. A second method is to fix definite periods ahead of time for performing ranging, then cluster the multiple periodic transmit signals together in sets at the transmitter and send them, and then disassemble those sets back into signals at the receiver. The transmitting and receiving is then controlled so that the transmit periods do not overlap with the ranging periods. In this way an optical access system is provided that can send and receive signals requiring periodic transmissions without interruption even during ranging operation.

21 Claims, 17 Drawing Sheets

FOREIGN PATENT DOCUMENTS

| | | |
|---|---|---|
| JP | 2003-283521 | 11/2002 |
| JP | 2003-244178 | 1/2003 |
| JP | 2005-33544 | 7/2003 |
| WO | WO 96/13915 | 10/1995 |

OTHER PUBLICATIONS

"Draft Amendment to Carrier Sense Multiple Access with Collision Detection (CSMA/CD) Access Method and Physical Layer Specifications", IEEE Draft P802.3ah ™/D3.3 (2002), pp. i-viii, and 469-525.

"Gigabit-Capable Passive Optical Networks (GPON): General Characteristics", Series G: Transmission Systems and Media, Digital Systems and Networks, International Telecommunication Union (Mar. 2003), 2 cover pages, pp. i-iii, and 1-14.

"Gigabit-Capable Passive Optical Networks (GPON): ONT Management and Control Interface Specification", Series G: Transmission Systems and Media, Digital Systems and Networks, International Telecommunication Union (Jun. 2004), 2 cover pages, pp. 1-110.

* cited by examiner

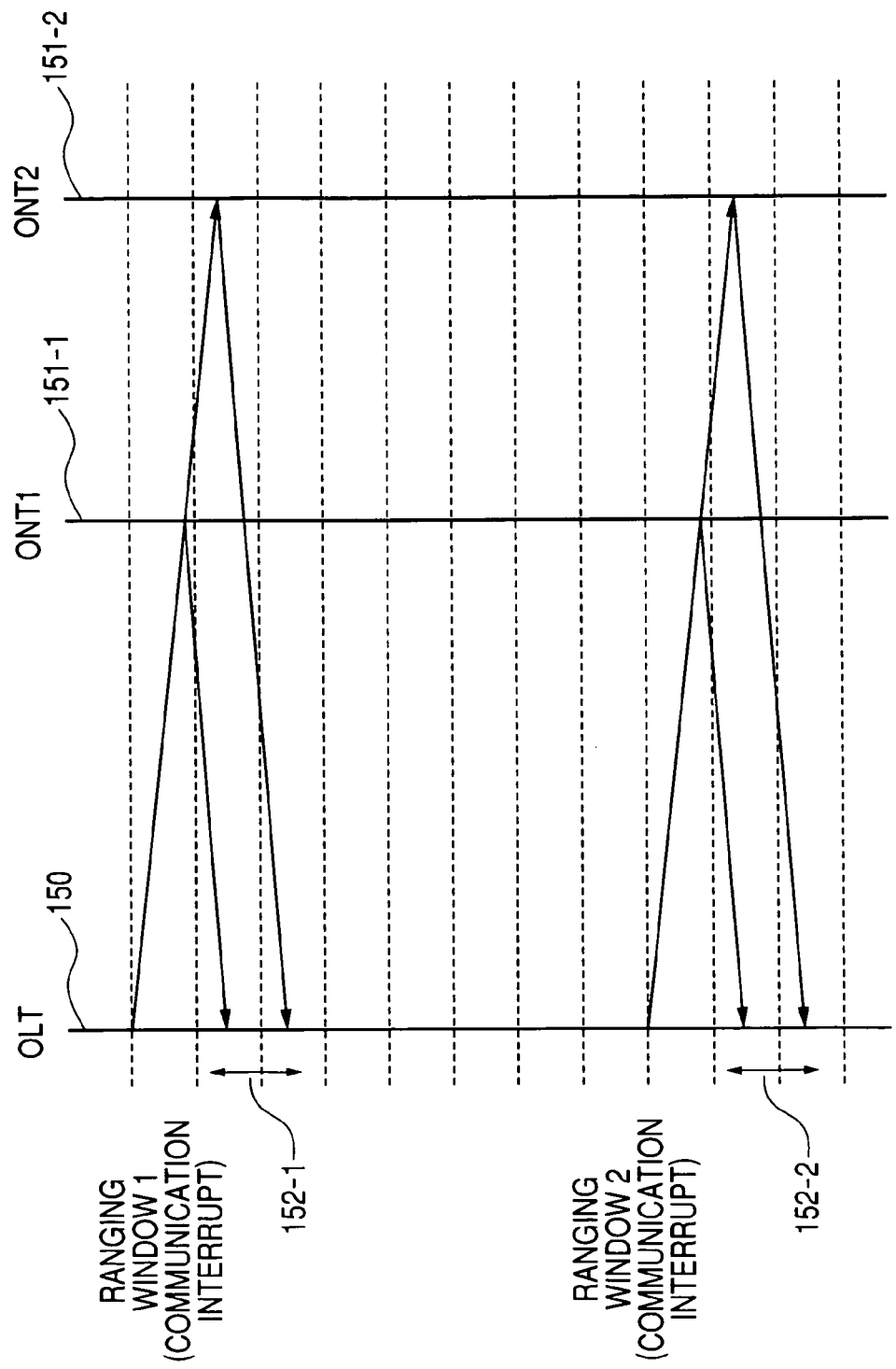

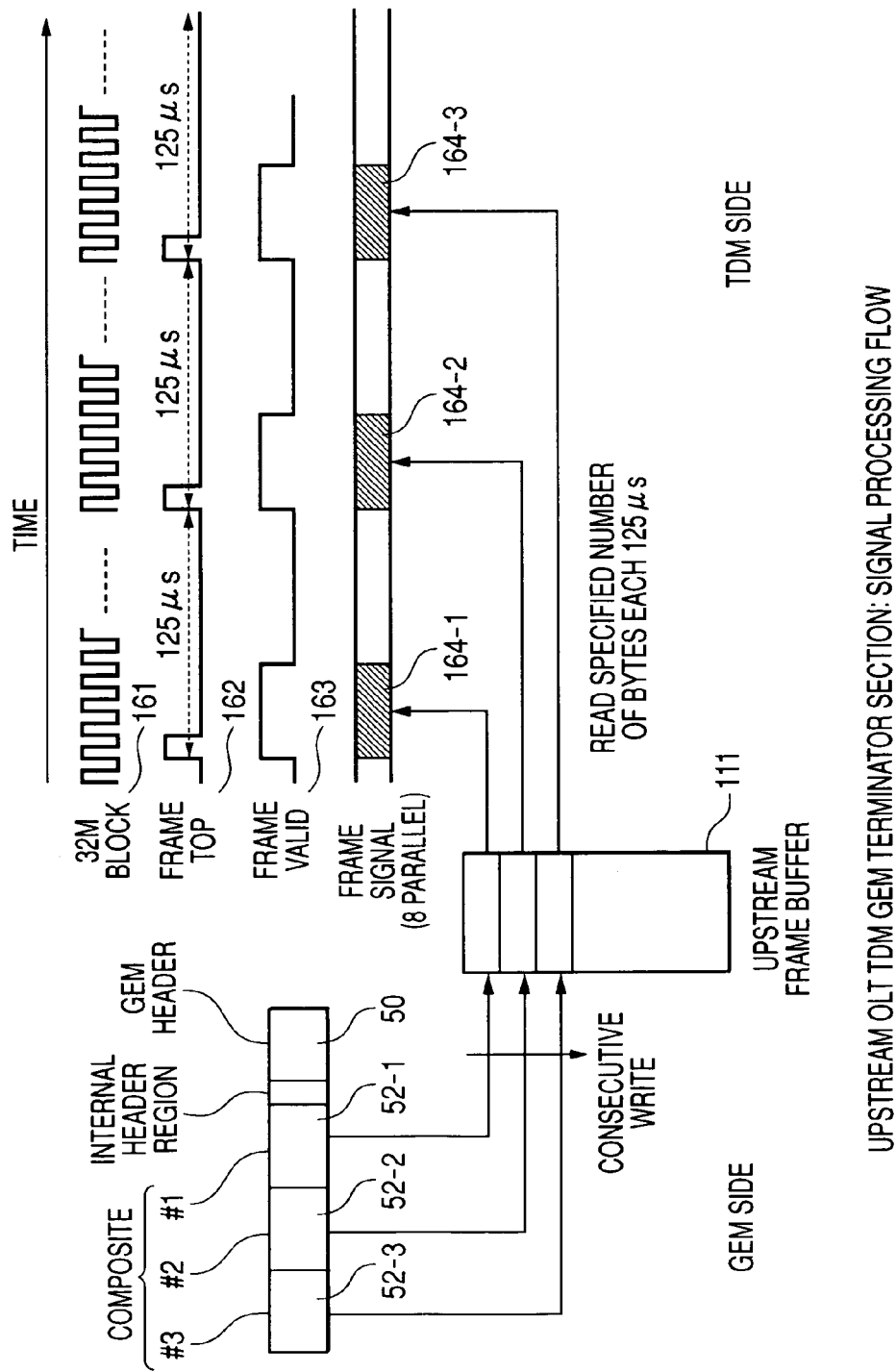

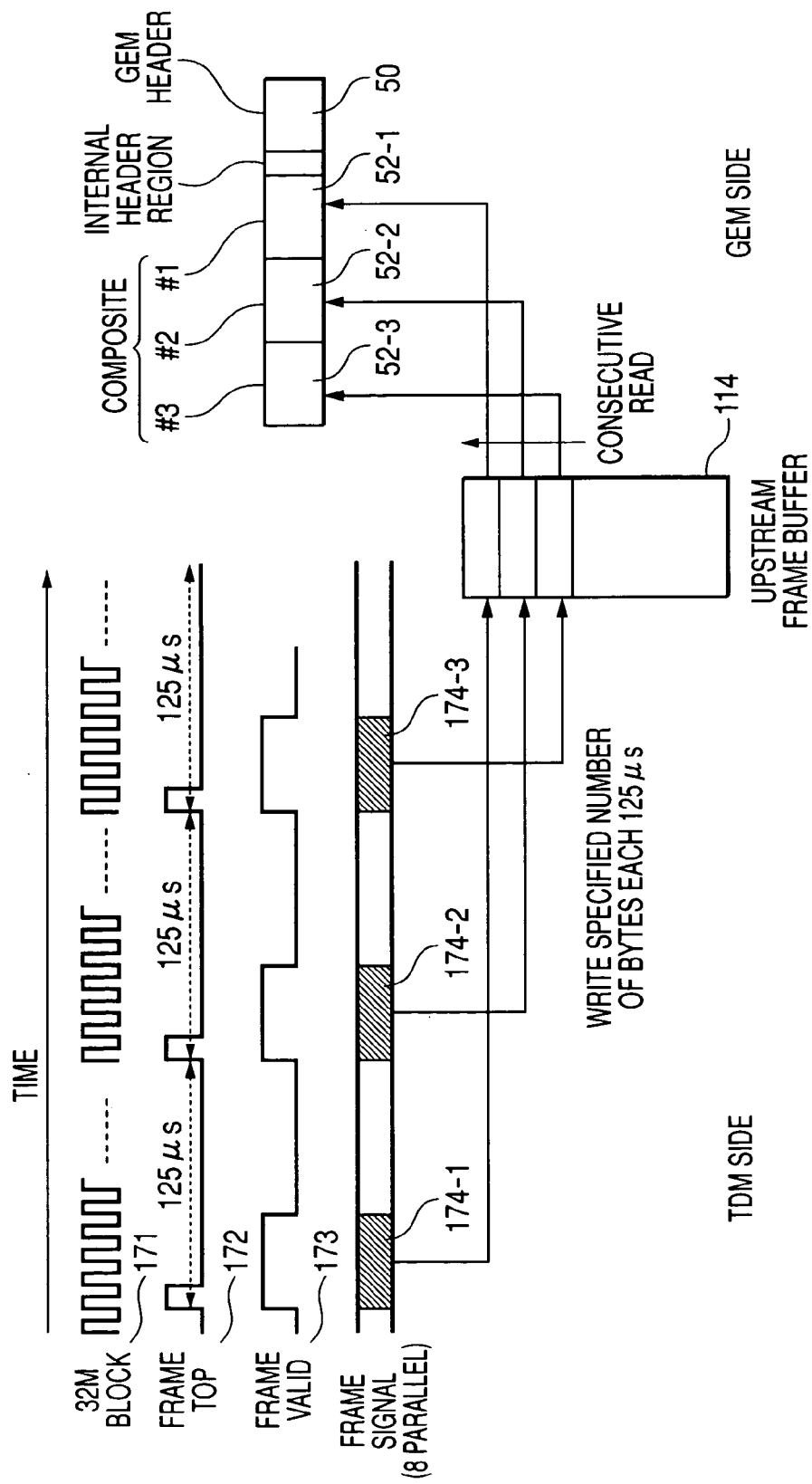

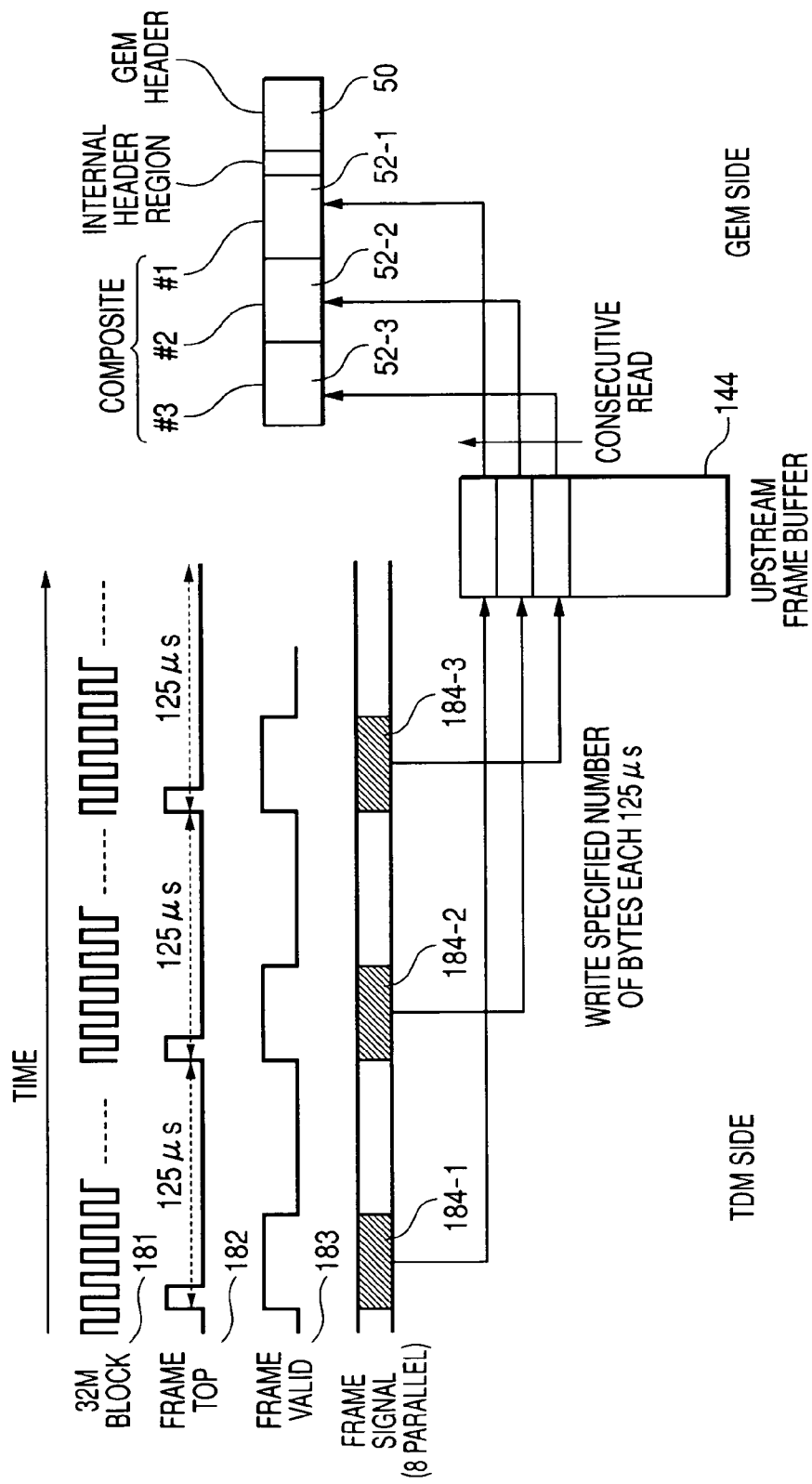

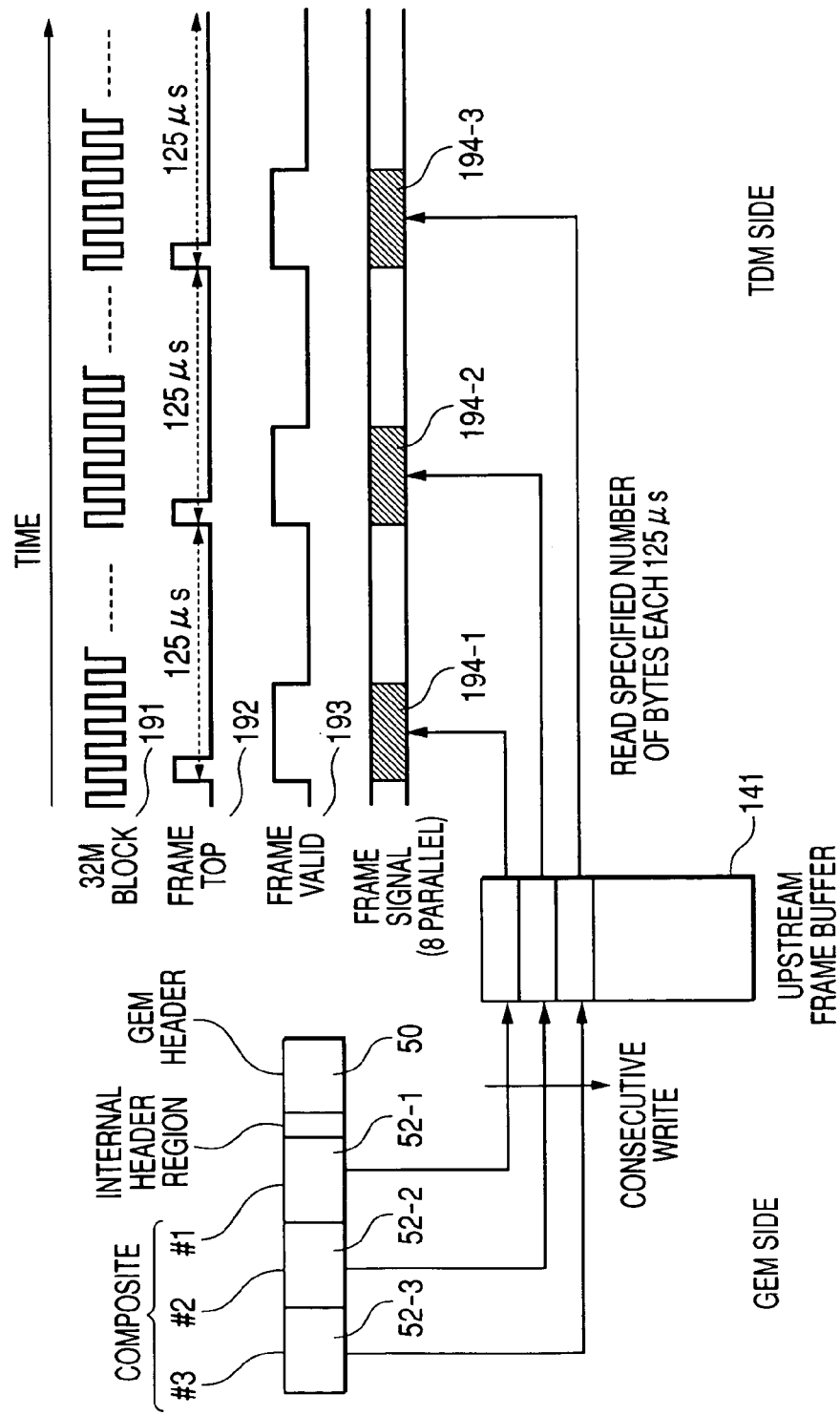

OPTICAL ACCESS SYSTEM

CLAIM OF PRIORITY

The present application claims priority from Japanese application JP 2005-219907 filed on Jul. 29, 2005, the content of which is hereby incorporated by reference into this application.

FIELD OF THE INVENTION

The present invention relates to an optical access system for communication between a subscriber residence and a communication provider station.

BACKGROUND OF THE INVENTION

Telephone subscriber networks and ADSL have been utilized in access networks for storing user stations in public communications networks for forwarding data such as audio or video. Moreover optical access systems have become more widespread in recent years.

These optical access systems use a method for connecting the station and the subscriber in a one-to-one relationship, and a method for connecting in a one-to-x relationship. The PON (Passive Optical Network) method is known as one-to-x connection method.

In the PON method, data communication is performed by sharing bandwidth between an OLT (Optical Line Terminal) and multiple ONT (Optical Network Terminal) by assigning one upstream and one downstream optical wavelength. In communication between the ONT and OLT, the downstream optical signal from the OLT heading towards the ONT is divided by a splitter, and the signal just for that particular ONT is extracted. In communication with the upstream signal, the OLT notifies the ONT of the transmission timing, and the ONT then transmits the signal to the OLT at that timing so that communication between the OLT and multiple ONT jointly on one wavelength.

Optical access methods of this type include: B-PON (Broadband PON) (See ITU-T Recommendation G.983.1, G.983.4), GE-PON (Giga-bit Ethernet PON) (See IEEE IEEE802.3ah), and G-PON (Generic PON) (See ITU-T Recommendation G.984.1, G.984.4) systems.

Signals communicated through PON systems are non-periodic signals such as webs and mail traffic over internet and periodic type signals conveyed by conventional telephone systems and leased line networks. The latter or periodic type signals (TDM: Time Division Multiplexing) have a fixed period (short-period frame) of 125 µs, and the signal is sent at a fixed bandwidth by transmitting a fixed amount of bytes within this fixed period. The signal must be sent each 125 µs period and no timing jitter is allowed.

SUMMARY OF THE INVENTION

In the PON system however, the distance between the ONT and OLT is not always a fixed distance. So the distance between the ONT and OLT must be measured periodically and the transmit timing of the ONT upstream signal must be corrected (This measurement and correction operation is called ranging.). When the distances between the OLT and ONT for example are distributed between 20 to 40 kilometers, the maximum allowable distance differential is 20 kilometers. To measure the distance of OLT and ONUs, the time of ranging (a ranging window) is up to 250 µs.

During the time of this measurement, only the frames for ranging are transmitted, then user's communications must be stopped during this time.

As described above, the periodic signal such as TDM signals required for a signal transmission at each 125 µs. The problem is that the ranging is performed and user signal is stopped for 250 µs, periodic signal communication becomes impossible and the signal is lost.

In a first aspect of this invention to resolve the above problems, the transmit signals are buffered (temporarily stored) at the transmitter during the ranging time and the signals then sent together when the ranging ends. Since some signals might not arrive during the ranging time, while no ranging is taking place, the receiver buffers ahead of time those TDM signals that are sent during the ranging time, and then transmits these buffered signals so that no interruption in communications will occur.

In a second aspect of this invention to resolve the above problems, long-period frames that are X-number of times larger than the short-period frames are utilized, and the ranging timing fixed at a specified position on the long-period frame. The communication signals are then clustered into multiple short-period frames ahead of time at the transmitter, assembled as composite frames and transmitted. These composite frames are then disassembled at the receiver, attached to a 125 µs signal and transmitted towards the next communications device. Communication interruptions can then in this way be avoided by scheduling the transmission timing of these composite frames so as not to conflict with the ranging timing.

This invention can therefore provide an optical access system capable of transmitting signals requiring periodic transmission without interruptions in communication even during the ranging operation.

BRIEF DESCRIPTION OF THE DRAWINGS

FIG. 13 is a drawing for describing the ranging method;

FIG. 14 is a block diagram of the signal processing in the upstream TDM GEM terminator device for the OLT of this invention;

FIG. 15 is a block diagram of the signal processing in the downstream TDM GEM terminator device for the OLT of this invention;

FIG. 16 is a block diagram of the signal processing in the upstream TDM GEM terminator device for the ONT of this invention; and FIG. 17 is a block diagram of the signal processing in the downstream TDM GEM terminator device for the ONT of this invention.

DETAILED DESCRIPTION OF THE PREFERRED EMBODIMENTS

Figure 1:
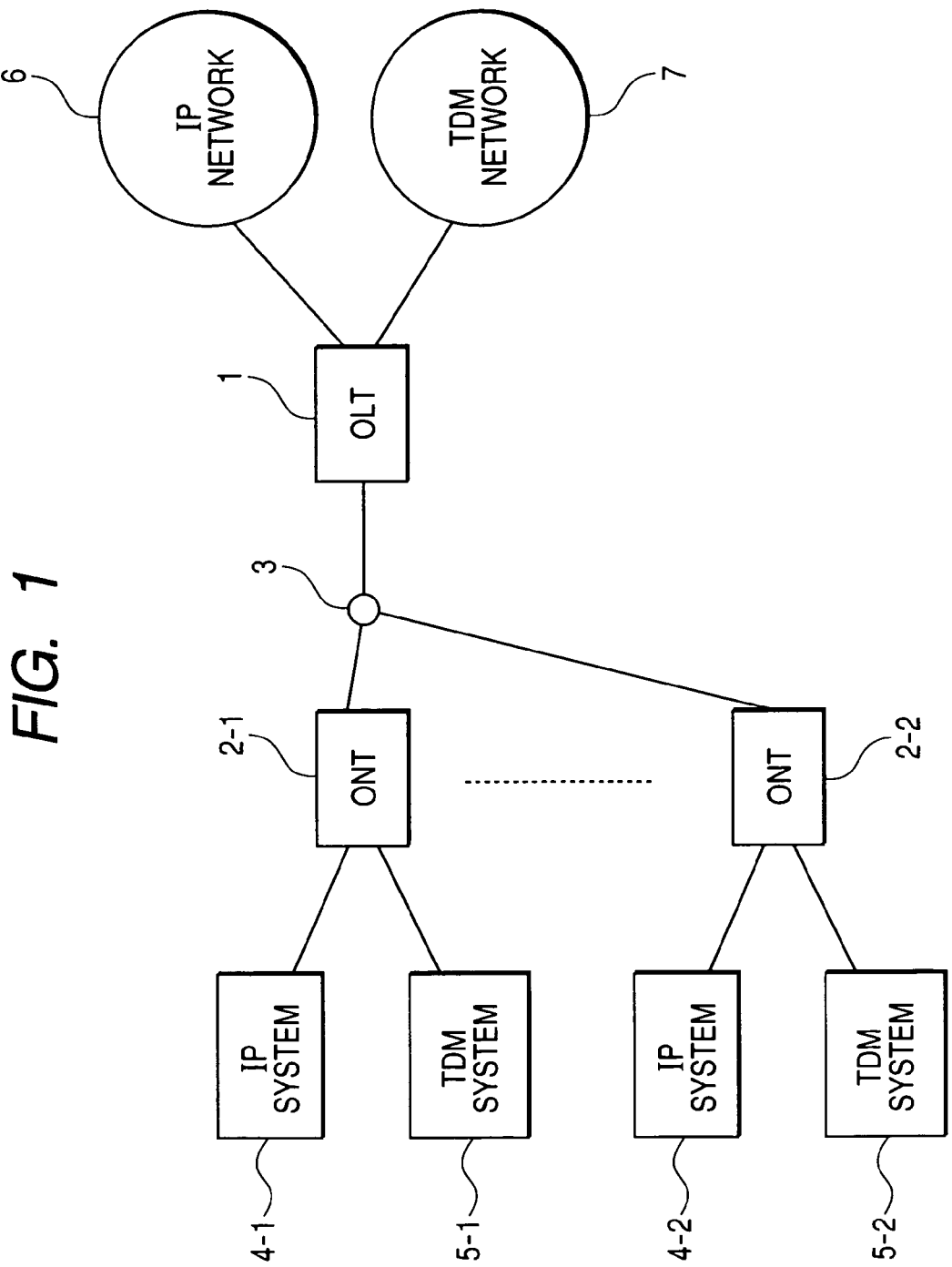
FIG. 1 is a drawing of the embodiment of the optical access network system of this invention.

FIG. 1 is a drawing showing the first embodiment of the optical access network system of this invention. The optical access network system is configured between the OLT-1 and the ONT 2-1, ONT 2-2. The OLT connects to each ONT via a splitter 3. At least one among the ONT 2 is connected to the IP system 4 and the TDM system 5. The OLT connects to the IP network 6 and the TDM network 7. TDM signals from the TDM system 5 are stored into the TDM network 7 via the optical network. Signals from the IP system 4 are stored in the IP network 6 via the optical network.

The ranging is described next using FIG. 13. Ranging is a process for measuring the distance between the OLT and ONT in order to correct the phase of the upstream signal. Ranging starts from the OLT and is performed by immediately returning the signal at each ONT. The ranging window 152 is the time in which ranging is performed and during this time, communication interruptions occur. In this invention, time-division multiplex signals can still be sent and received even during the communication interruption time that is characteristic of optical access systems.

Figure 2:
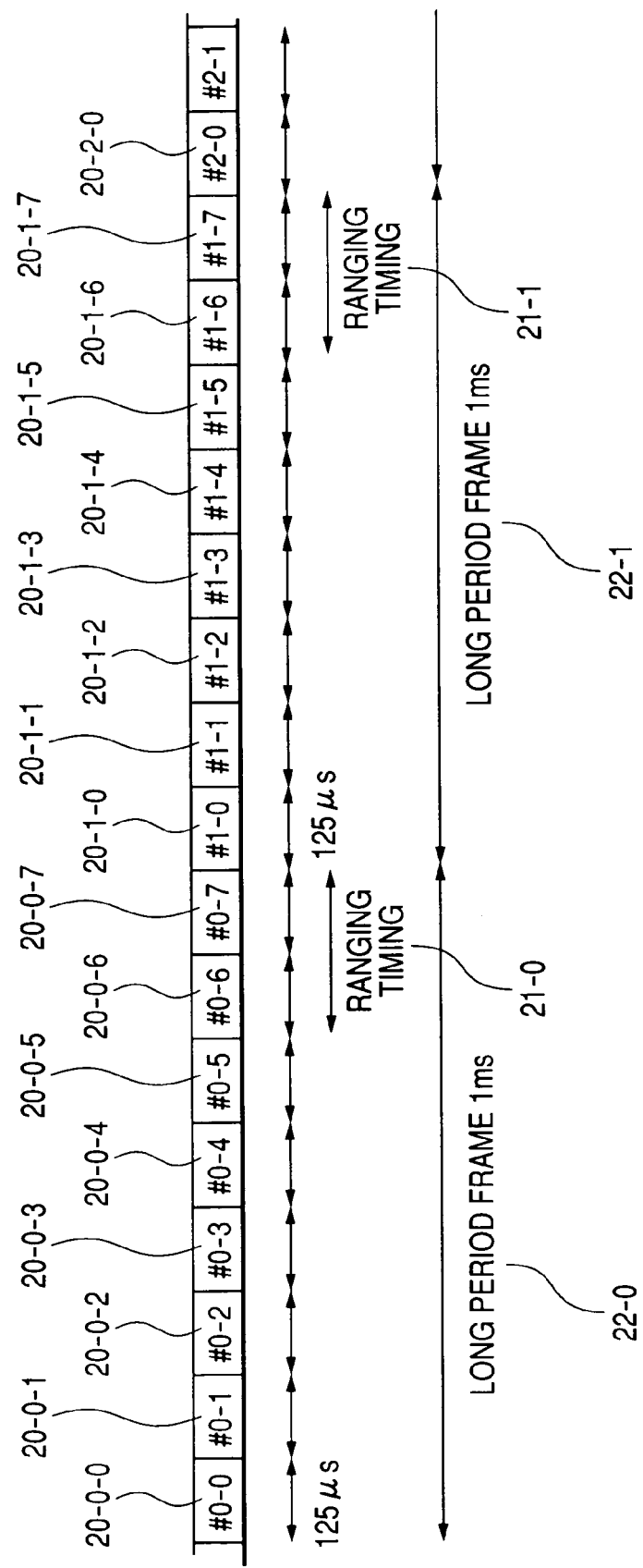
FIG. 2 is an example of the frame timing of this invention.

FIG. 2 is an example of the transmission frame timing in the optical access system of this invention. Short-period frames each 125 µs long are utilized for communication between the OLT 1 and ONT 2. Communication is performed multiplexing multiple packets called GEM within these short-period frames 20. This embodiment utilizes a 1 ms long-period frame 22 of multiple frames, and a range timing 21 is fixed to the frame 22. Here, the term "fixed" indicates performing ranging at a fixed timing on the long-period frame period. In this example, the long-period frame is eight times longer than the short-period frame, and the range timing is fixed to No. 6 20-0-6 and No. 7 20-0-7 within this long-period frame. By fixing the range timing 21 to the long-period frame 22, it is possible to predict when the communications will be cut off (interrupted).

Figure 3:
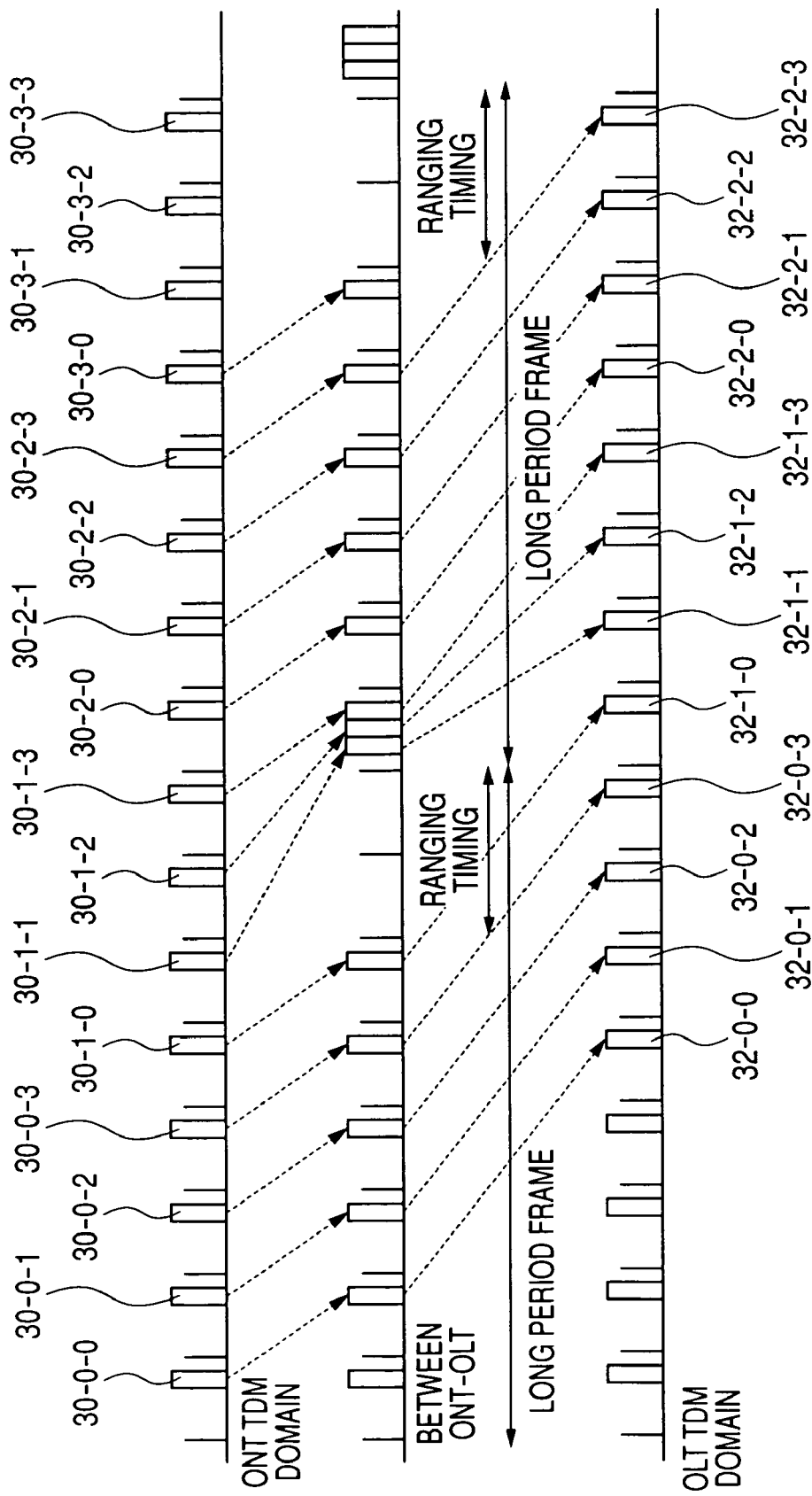
FIG. 3 is one example of the signal transmit/receive timing of this invention.

FIG. 3 is one example of the signal transmit frame timing in the optical access system of this invention. In this example, the communication is cut off during the range timing so that a two frame portion of the TDM signal is buffered in advance on the receive side device (OLT in the case of this figure) to prepare for ranging, and the communication interruption is avoided by sending the TDM signal from the buffer within that range timing.

Figure 4:
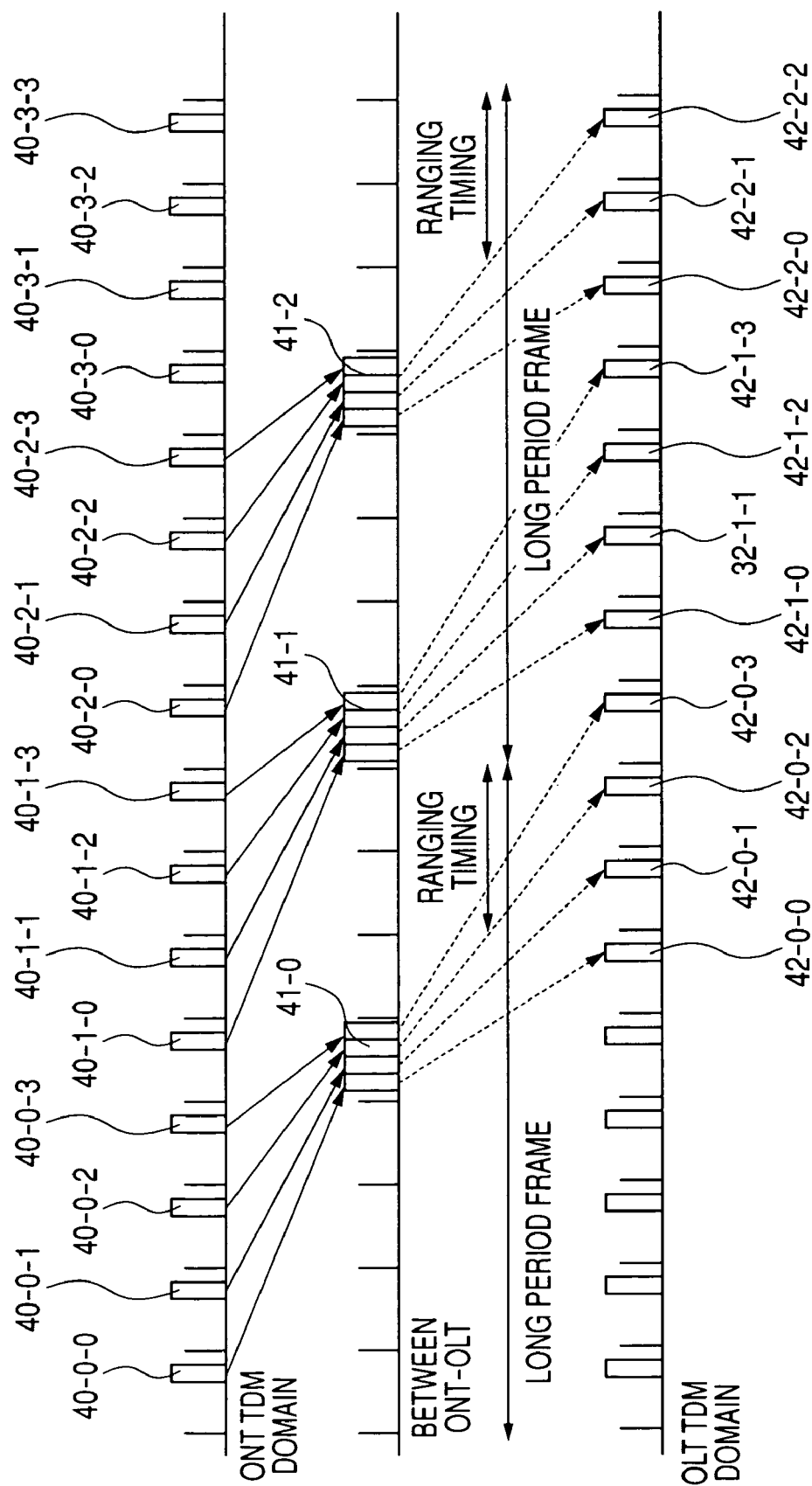
FIG. 4 is one example of the signal transmit/receive timing of this invention.

FIG. 4 is one example of the signal transmit/receive frame timing of the optical access system of this invention. The composite method is used in this example. The composite method is a method in which a TDM signal made up of a fixed number of x frames are constantly buffered on the transmit side device, and sent together as GEM. In this figure, ONT is the transmit side device, and OLT 1 is the receive side device. The TDM signals 40 arrive periodically at the ONT 2. The ONT 2 buffers and then clusters these signals side-by-side in groups of four each, and consistently transmits them in groups of four as a GEM in the same short-period frame towards the OLT 1. The OLT 1 disassembles this GEM and transmits each short-period frame as a TDM signal. In this example, the 1 ms long-period frame is a group of four frames so if composite packets 41 are transmitted in the first and fifth or the second and sixth short-period frames inside the long-period frame, then the composite packets 41 can be transmitted while avoiding the ranging timing fixed at the seventh and eighth (short-period frames) so that communication interruptions can be avoided.

Figure 5:
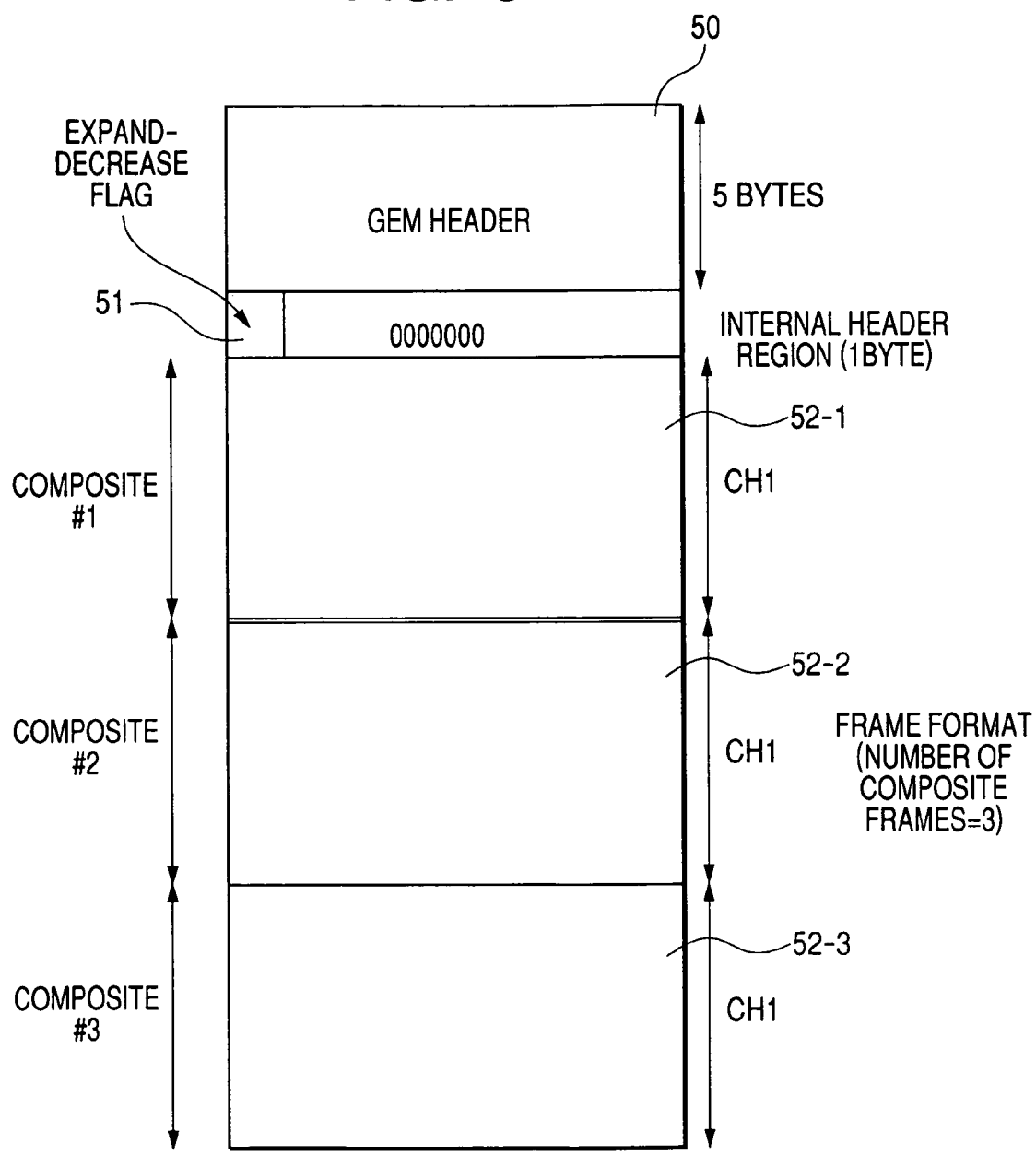
FIG. 5 is an example of the transmit/receive packet format of this invention.

FIG. 5 is an example of the composite packet of this invention. This drawing shows the case where the composites are equivalent to three time slots. The composite TDM signals 52 are multiplexed to the rear of the GEM header 50. An expand-decrease flag 51 is a field for communicating information relating to expansion or reduction. This expand-decrease flag 51 is sometimes utilized for expanding or reducing the number of TDM channels for the applicable ONT 2.

Figure 6:
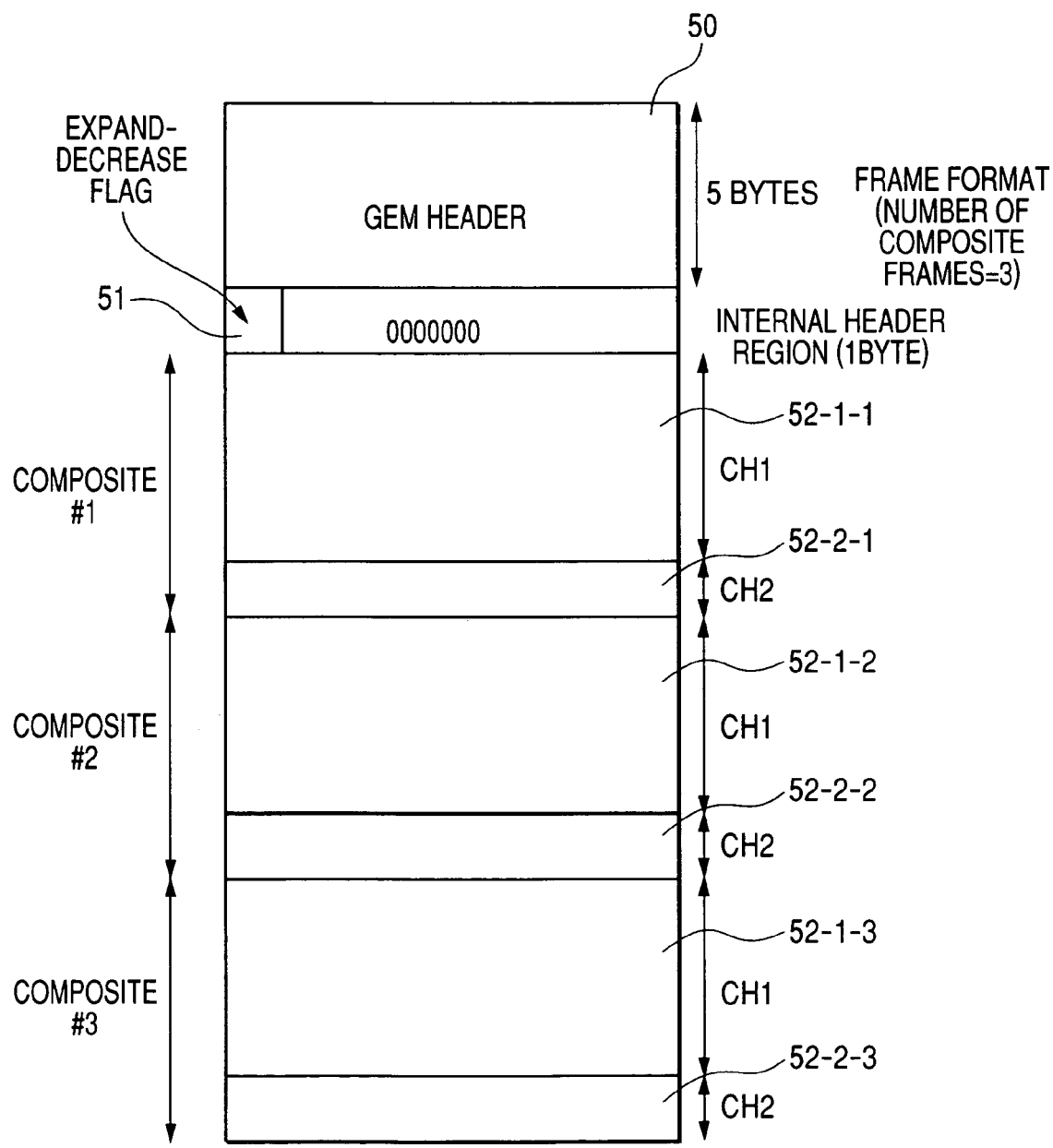
FIG. 6 is an example of the transmit/receive packet format of this invention.

FIG. 6 is an example of a composite packet. This drawing shows the case where the composites are equivalent to three time slots. This drawing also shows the case in which two TDM channels are assigned to the applicable ONT 2. Signals for CH1 52-1 and CH2 52-2 are alternately loaded in three frames in the same GEM. The expand-decrease flag 51 is a field for communicating information relating to expansion or reduction. This expand-decrease flag 51 is sometimes utilized for expanding or reducing the number of TDM channels for the applicable ONT 2.

Figure 7:
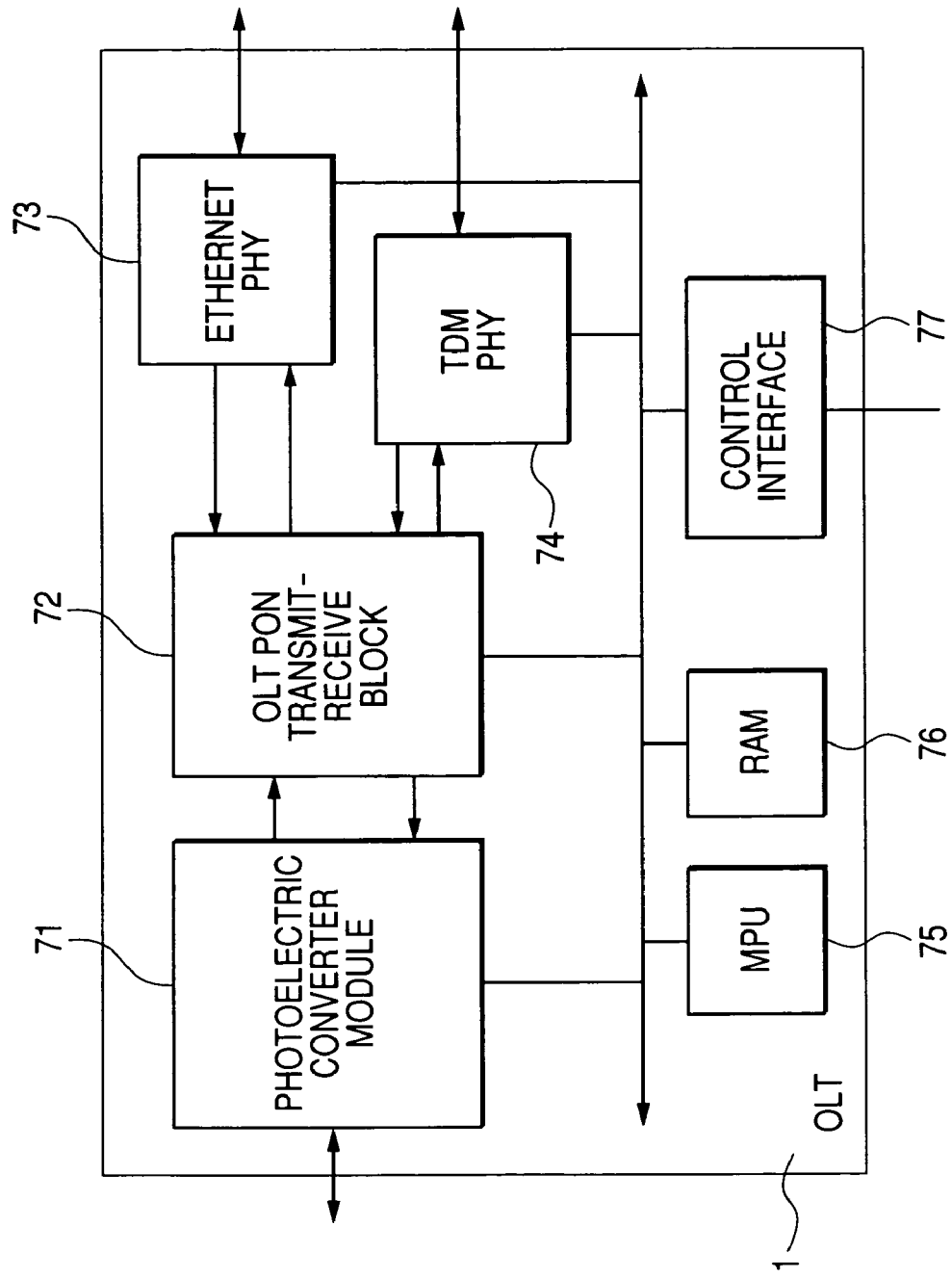
FIG. 7 is an example of the optical line terminal (OLT) of this invention.

FIG. 7 is a block diagram showing the structure of the OLT 1 in this invention. Upstream signals arriving from the optical access network are converted to electrical signals in the photoelectric converter module 71, and next GEM-terminated in the OLT PON transmit/receiver block 72, then converted to Ethernet frames and TDM signals, and sent respectively to the Ethernet PHY 73 and the TDM PHY 74, and transmitted to the IP network 6 and the TDM signal network 7. Downstream signals arriving from the Ethernet PHY 73 and the TDM PHY 74 are first respectively received at the Ethernet PHY 73 and TDM PHY 74, and next assembled into GEM frames in the OLT PON transmit/receiver block 72, and then transmitted via the photoelectric converter module 71 to the optical network 7. An MPU 75 and RAM 76, and control interface 77 are a microcomputer for controlling the OLT, a RAM, and a setup interface for making external settings to the OLT.

Figure 8:
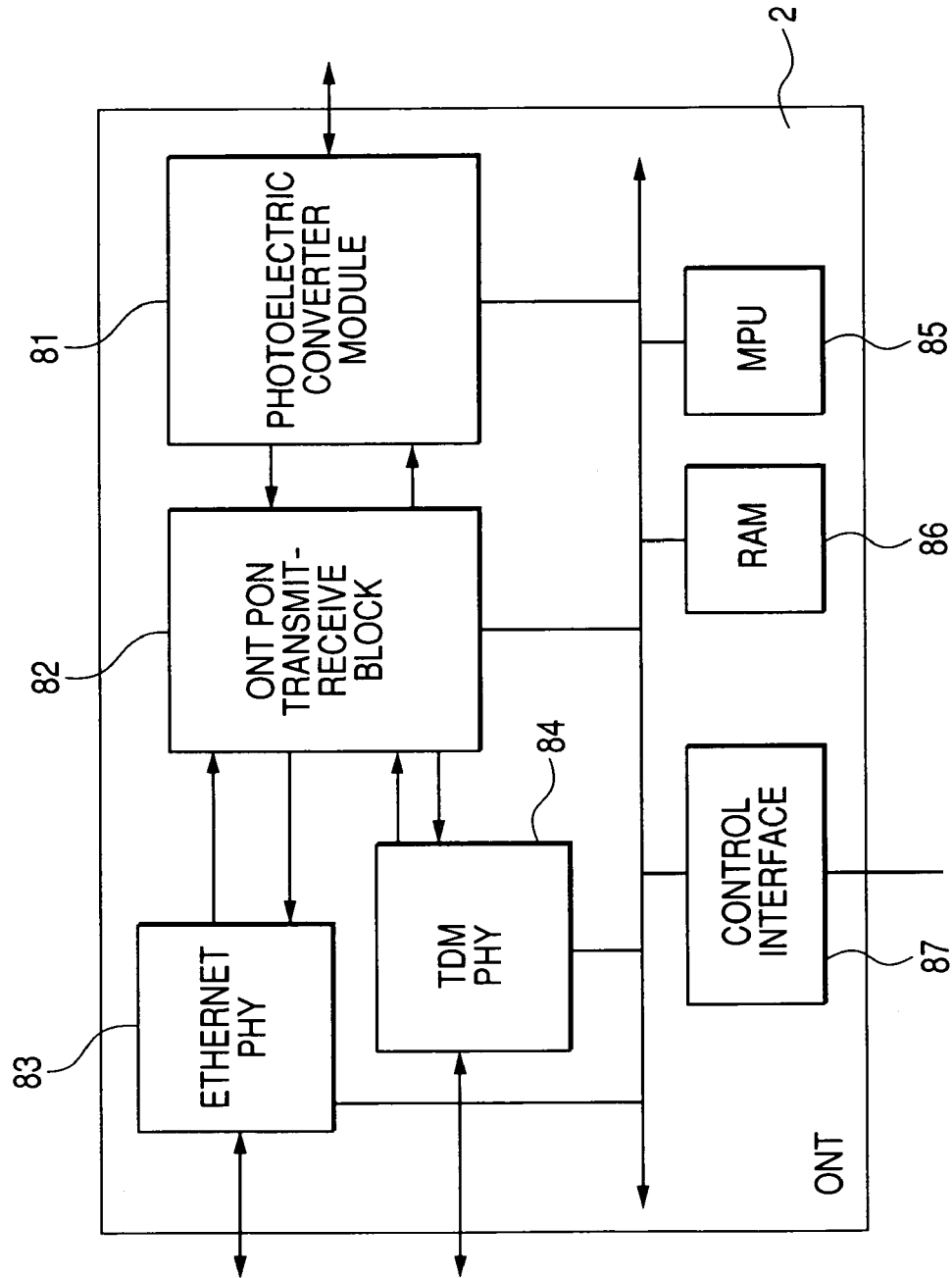
FIG. 8 is an example of the subscriber optical network terminal (ONT) of this invention.

FIG. 8 is a block diagram showing the structure of the ONT 1 of this invention. Downstream signals arriving from the optical access network are converted into electrical signals by the photoelectric converter module 81, GEM-terminated by the ONT PON transmit/receiver block 82, then converted to Ethernet frames and TDM signals, and sent respectively to the Ethernet PHY 83 and the TDM PHY 84, and transmitted to the IP system 4 and the TDM system 5. After the upstream signals arriving from the IP system 4 and the TDM system 5 are received respectively at the Ethernet PHY 83 and the TDM PHY 84, they are assembled into GEM frames in the ONT PON transmit/receiver block 82, and then transmitted via the photoelectric converter module 81 to the optical network 7. An MPU 85 and RAM 86 and control interface 87 are a microcomputer for controlling the ONT, a RAM, and a setup interface for making external settings to the ONT.

Figure 9:
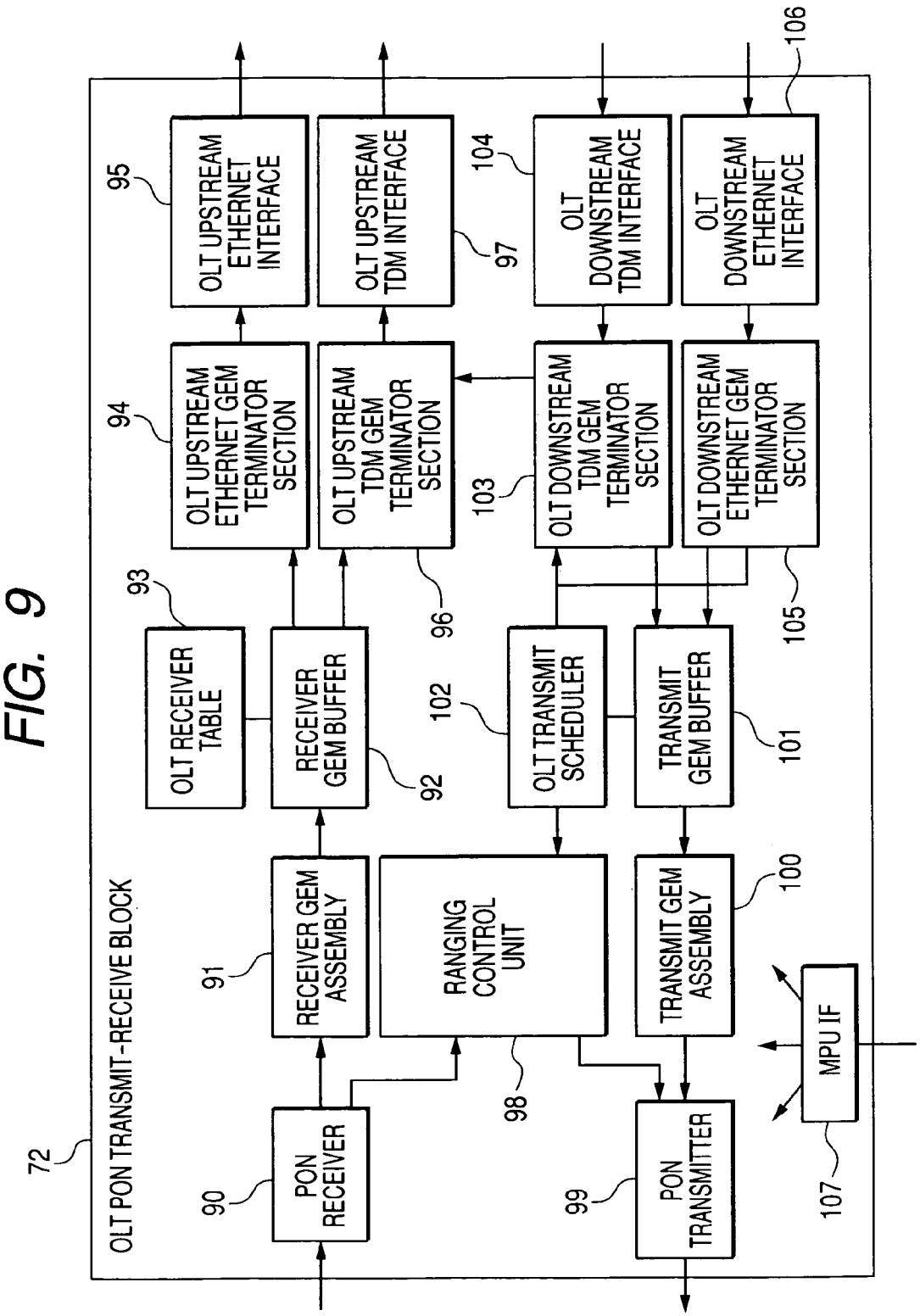
FIG. 9 is an example of the PON transmit/receive block for the OLT of this invention.

FIG. 9 is a block diagram showing in detail the structure of the OLT PON transmit/receiver block 72. The upstream signals from the photoelectric converter module 71 arrive at the PON receiver 90. Here, after synchronizing and GEM extraction are performed, the signals divided into multiple transmitted short-period frames are GEM assembled in the receiver GEM assembly 91. After then storing them in the receiver GEM buffer 92, they are assigned to the OLT upstream Ethernet GEM terminator section 94 and the OLT upstream TDM GEM terminator section 96 according to table information in the OLT receive table 93. The Ethernet frames are transmitted via the OLT upstream Ethernet interface 95 to the Ethernet PHY 73. The TDM signals are extracted from (TDM) composite packets by the OLT upstream TDM GEM terminator section 96, and sent at the desired timing via the OLT upstream TDM interface 97, to the TDM PHY 84.

The downstream signals are received as TDM signals from the OLT downstream TDM interface 104, and the OLT downstream TDM GEM terminator section 103 buffers (temporarily stores) the TDM signals and assembles them into composite frames. The Ethernet frames are received from the OLT downstream Ethernet interface 106, and the OLT downstream Ethernet GEM terminator section 105 then generates the GEM. The OLT downstream Ethernet GEM terminator section 105 then periodically loads the (TDM) composite GEM from the OLT downstream TDM GEM terminator section 103, at the available timing according to instructions from the OLT transmit scheduler 102. After the transmit GEM assembly 100 generates headers via the transmit GEM buffer 101, the PON transmitter 99 transmits the GEM frames. When performing ranging, the ranging control unit 98 starts ranging with a ranging signal at the timing allowed by the OLT transmit scheduler 102, and the PON transmitter 99 sends the ranging signals. A reply from ONT 2 then returns to the ranging control unit 98 via the PON receiver 90 to complete the ranging.

Figure 10:
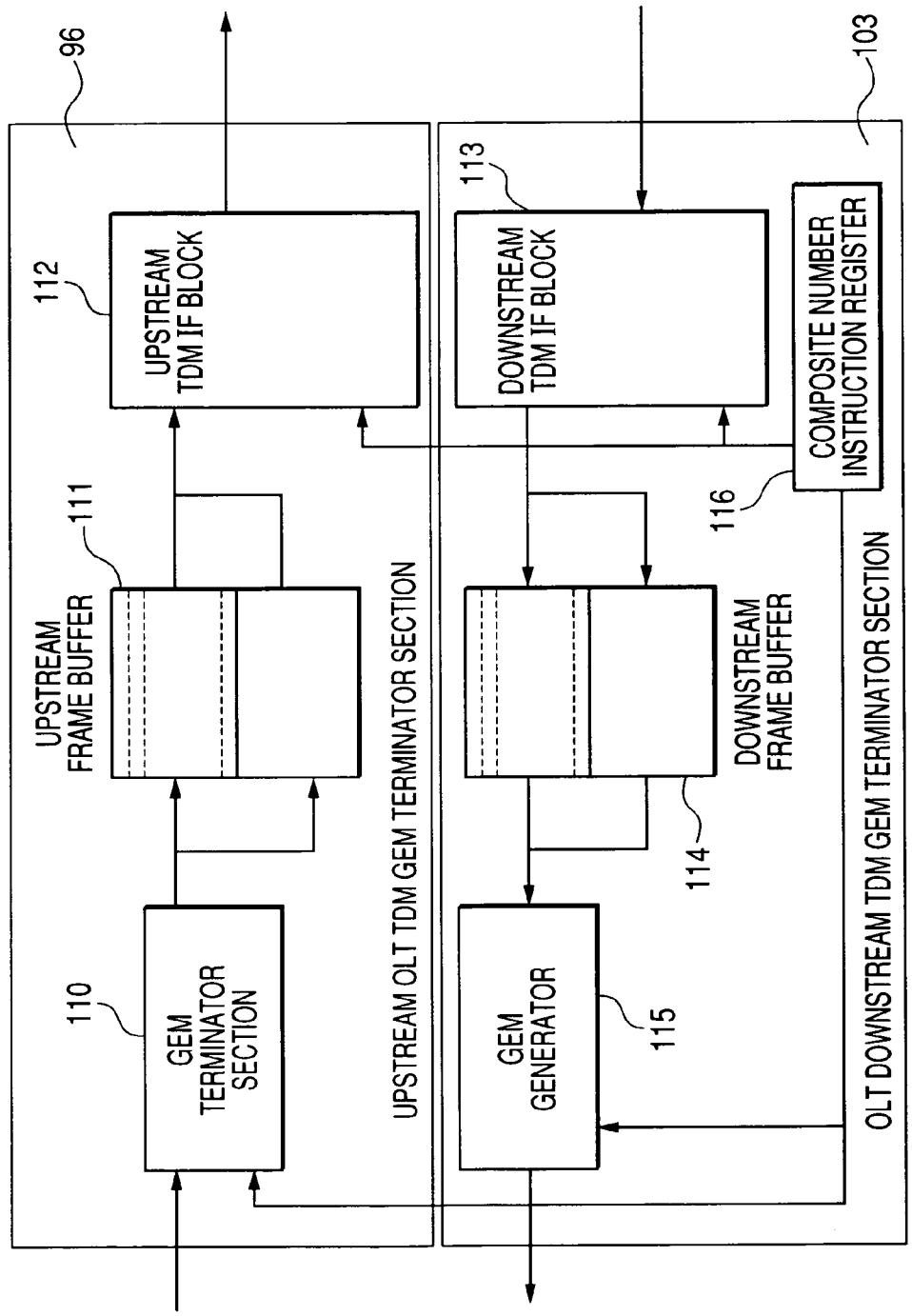
FIG. 10 is an example of the TDM GEM terminator devices for the OLT of this invention.

FIG. 10 is a block diagram showing the structure of the OLT upstream TDM GEM terminator section 96 and the OLT downstream TDM GEM terminator section 103. After the GEM terminator section 110 deletes the GEM headers of upstream receiver GEM holding the TDM signals, a payload section is written on the upstream frame buffer 111. The upstream TDM IF block 112 reads out (or loads) the TDM signals according to values in the composite number instruction register 116 and transmits them every 125 µs. These TDM signals headed downstream arrive at the downstream TDM IF block 113 every 125 µs, and those signals are then written in the downstream frame buffer 114. The storage position in the memory is at this time set according to the value in the composite number instruction register 116. The GEM generator 115 assembles the specified number of composite frames according to values in the composite number instruction register 116, attaches a GEM header and transmits the frames.

FIG. 14 is a drawing showing the method for disassembling GEM frames and generating TDM frames in the OLT upstream TDM GEM terminator section 96. After receiving the composite GEM frames (of TDM signals), the OLT upstream TDM GEM terminator section 96 deletes the GEM header 50 and internal header region, and consecutively writes the payload 52 for the composite frame in fields on the upstream frame buffer 111. The upstream TDM IF block 112 generates 125 µs period frames 162 at the clock 161 (32 MHz in this example), and the arriving composite TDM signals respectively mapped as 164-1 through 3 and transmitted at 125 µs period each. The frame valid signal 163 flows in parallel with the frame at this time and indicates whether the TDM signal is valid or invalid. The TDM PHY 74 receives this signal, and a TDM signal is sent here by mapping in SDH frames.

FIG. 15 is a drawing showing the method for receiving TDM frames and generating GEM frames in the OLT downstream TDM GEM terminator section 103.

The mapped signal comprised of SDH frames received at the TDM PHY 74 is converted here to a signal flowing in parallel with a clock signal 171, a frame top signal 172, and a frame valid signal 173 and these signals are input to the OLT downstream TDM GEM terminator section 103. These signals arriving every 125 µs are each written in a specified number of bytes on a specified region of the downstream frame buffer 114. When the writing ends and the GEM generator 115 finishes generating the internal header region and GEM headers, the signals are loaded (read-out) as a consecutive number of composites from the upstream frame buffer 114, and GEM frames are generated. These frames are sent to the transmit GEM buffer and transmitted to the PON domain.

Figure 11:
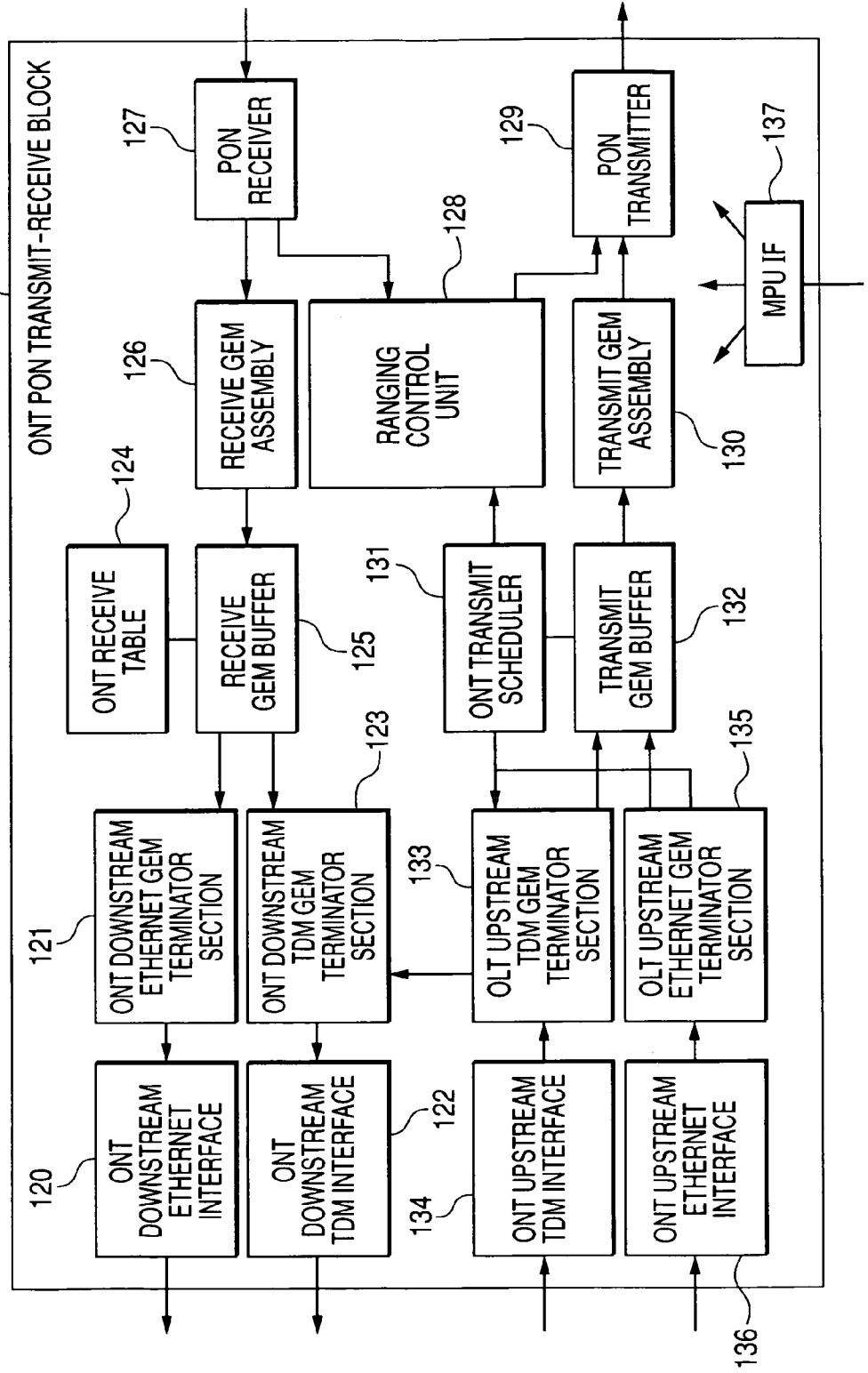
FIG. 11 is an example of the PON transmit/receive block for the ONT of this invention.

FIG. 11 is a block diagram showing the ONT PON transmit/receiver block 82. The downstream signal arrives at the PON receiver 127 from the photoelectric converter module 71. Here, after synchronizing and GEM extraction are performed, the signals divided into multiple transmitted short-period frames are GEM assembled in the Receive GEM assembly 126. After then storing them in the receiver GEM buffer 125, they are assigned to the ONT upstream Ethernet GEM terminator section 121 and the ONT upstream TDM GEM terminator section 123 according to table information in the ONT receive table 124. The Ethernet frames are transmitted via the ONT upstream Ethernet interface 120 to the Ethernet PHY 83. The TDM signals are extracted from (TDM) composite packets by the ONT downstream TDM GEM terminator section 123, and sent at the desired timing via the ONT upstream TDM interface 122, to the TDM PHY 84.

The upstream signals are received as TDM signals from the ONT upstream TDM interface 134, and the ONT upstream TDM GEM terminator section 133 buffers (temporarily stores) the TDM signals and assembles them into composite frames. The Ethernet frames are received from the ONT upstream Ethernet interface 136, and the ONT upstream Ethernet GEM terminator section 135 then generates the GEM. The ONT upstream Ethernet GEM terminator section 135 then periodically loads the (TDM) composite GEM from the ONT upstream TDM GEM terminator section 133 at the available timing according to instructions from the OLT transmit scheduler 131. After the transmit GEM assembly 130 generates headers via the transmit GEM buffer 132, the PON transmitter 129 transmits the GEM frames.

When ranging is requested, the ranging control unit 128 processes the ranging request signal received at the PON receiver 127, and the ONT 2 completes the ranging process by sending the ranging receive signal back via the PON transmitter 129.

Figure 12:
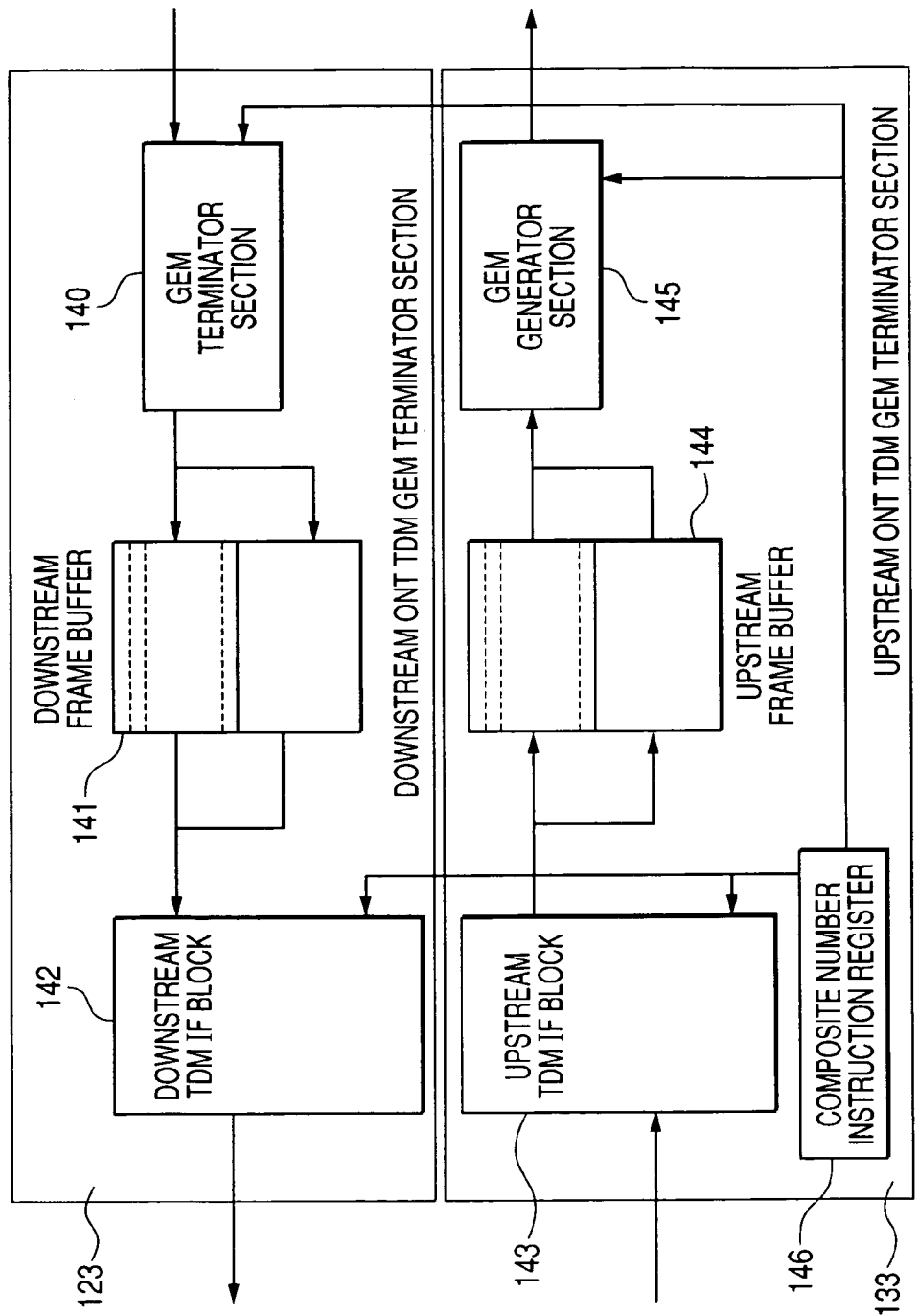
FIG. 12 is an example of the TDM GEM terminator devices for the ONT of this invention.

FIG. 12 is a block diagram showing the structure of the ONT downstream TDM GEM terminator section 123 and the ONT upstream TDM GEM terminator section 133. After the GEM terminator section 140 deletes the GEM headers of downstream receiver GEM holding the TDM signals, a payload section is written on the downstream frame buffer 141. The downstream TDM IF block 142 reads out (or loads) the TDM signals according to values in the composite number instruction register 146 and transmits them every 125 µs. These TDM signals headed upstream arrive at the upstream TDM IF block 143 every 125 µs, and those signals are then written in the upstream frame buffer 144. The storage position in the memory is at this time set according to the value in the composite number instruction register 146. The GEM generator 145 assembles the specified number of composite frames according to values in the composite number instruction register 146, attaches a GEM header and transmits the frames.

FIG. 16 is a drawing showing the method for receiving TDM frames and generating GEM frames in the ONT upstream TDM GEM terminator section 133. The mapped TDM signal received as SDH frames at the TDM PHY 84 is converted here to a signal flowing in parallel with a clock signal 181, a frame top signal 182, and a frame valid signal 183, and these signals are input to the upstream TDM IF block 143. These signals arriving every 125 μs are each written in a specified number of bytes on a specified region of the downstream frame buffer 141. When the writing ends and the GEM generator 145 finishes generating the internal headers and GEM headers, the signals are loaded (read-out) as a consecutive number of composites from the upstream frame buffer 144, and GEM frames are generated. These frames are sent to the transmit GEM buffer and transmitted to the PON domain.

FIG. 17 is a drawing showing the method for disassembling the GEM frames and generating TDM frames in the ONT downstream TDM terminator section 123. After receiving the composite GEM frames (of TDM signals), the ONT downstream TDM terminator section 123 deletes the GEM header 50 and internal header region, and consecutively writes the payload 52 for the composite frame in fields on the upstream frame buffer 141. The downstream TDM IF block 142 generates 125 μs period frames 192 at the clock 191 (32 MHz in this example), and transmits the arriving composite TDM signals respectively mapped as 194-1 through 3, every 125 μs. The frame valid signal 193 flows in parallel with the frame at this time and indicates whether the TDM signal is valid or invalid. The TDM PHY 84 receives this signal and by mapping in frames such as T1, a TDM signal is sent at this point.

What is claimed is:

1. An optical access system including:
   multiple Optical Network Terminals connected respectively to user terminals, each containing an interface for sending/receiving time-division multiplexed signals and packet multiplexed signals, and an interface for multiplexing the time-division multiplexed signals and packet multiplexed signals and sending/receiving the multiplexed signals; and
   an Optical Line Terminal connected to a network and the Optical Network Terminals via a splitter and an optical fiber, and said Optical Line Terminal containing an interface for sending/receiving time-division multiplexed signals and packet multiplexed signals, and an interface for multiplexing the time-division multiplexed signals and packet multiplexed signals and sending/receiving the multiplexed signals,
   wherein the Optical Network Terminals and the Optical Line Terminal communicating with each other with first periodic frames and performing a ranging for measuring a distance between the Optical Line Terminal and the Optical Network Terminals,
   wherein when sending signals from one of the Optical Network Terminals to the Optical Line Terminal, said one Optical Network Terminal transmits the time-division multiplexed signals with second periodic frames each period of which being longer than a period of the first periodic frame and containing a fixed number of the first periodic frames transmitted from one of the user terminals to said one Optical Network Terminal, and transmission of the second periodic frames is scheduled so that the timing not is not overlapped with a ranging time during which the ranging is being performed, and
   when sending signals from the terminal Optical Line Terminal to one of the Optical Network Terminals, the Optical Line Terminal transmits the time-division multiplexed signals with the second periodic frames each period of which being longer than the period of the first periodic frame and containing a fixed number of the first periodic frames transmitted from the Optical Line Terminal to one of the user terminals, and transmission of the second periodic frames is scheduled so that the timing is not overlapped with the ranging time.

2. An optical access system according to claim 1, wherein the period of the second periodic frame is a multiple of a 1 millisecond constant.

3. An optical access system according to claim 1, wherein when sending signals from the Optical Network Terminals to the network via the Optical Line Terminal the Optical Network Terminals make packets storing plural and x number of time division multiplexed signals transmitted from one of the user terminals to said one Optical Network Terminal, and transmit the packets each x number of time divided periods, moreover the transmission of the packets is scheduled so that the timing does not overlap on the ranging time, and the Optical Line Terminal receives the packets, disassembles the x number of time-divided signals stored in each packet into x number of frames, and transmits the frames to the network,
   and when sending signals from the Optical Line Terminal to the terminals via the Optical Network Terminals; the Optical Line Terminal makes packets storing plural and x number of time division multiplexed signals transmitted from the Optical Line Terminal to one of the user terminals, and transmits the packets each x number of time-divided periods, moreover, the transmission of the packets is scheduled so that the timing is not overlapped with the ranging time during which the ranging is being performed, and the Optical Network Terminals receive the packets, disassemble the x number of time-divided signals stored in each packet into x number of frames, and transmit the frames to the terminals.

4. An optical access system according to claim 3, wherein the packets contain a GEM header of G-PON (Generic Passive Optical Network) and consecutive x number of time-division multiplexed signals following the GEM header.

5. An optical access system according to claim 3, wherein the x is any one among 3, 4, 6, or 8.

6. An optical access system according to claim 3, wherein the packet contains multiple structural units when one structural unit contains a GEM header of G-PON (Generic Passive Optical Network) and the consecutive x number of time-division multiplexed signals following the GEM header.

7. An optical access system according to claim 6, wherein the packet contains a flag for notifying the Optical Network Terminal of an increase or decrease in the number of time-division multiplexed signals in the packet.

8. An Optical Network Terminal connected to respective user terminals, and also connected to networks via an Optical Line Terminal, and including:
   an interface for sending/receiving time-division multiplexed signals and packet multiplexed signals, and
   an interface for multiplexing the time-division multiplexed signals and packet multiplexed signals and sending/receiving the multiplexed signals, wherein the Optical Network Terminal communicates with the Optical Line Terminal by using first periodic frames and performing a ranging for measuring a distance from the Optical Line Terminal, and wherein when sending signals from the Optical Network Terminal to the Optical Line Terminal, the Optical Network Terminal transmits the time-division multiplexed signals with second periodic frames each period of which being longer than a period of the first periodic frame and containing a fixed number of the first periodic frames transmitted from one of the user terminals to the Optical Network Terminal, and transmission of the second periodic frames is scheduled so that the timing is not overlapped with a ranging time during which the ranging is being performed.

9. An Optical Network Terminal according to claim 8, wherein the period of the second periodic frame is a multiple of a 1 millisecond constant.

10. An Optical Network Terminal according to claim 8, wherein when sending signals from the Optical Network Terminal to the network via the Optical Line Terminal; the Optical Network Terminal makes packets storing plural and x number of time-division multiplexed signals transmitted from one of the user terminals to the Optical Network Terminal, and transmits the packets each x number of time divided periods, and the transmission of the packets is scheduled so that the timing is not overlapped with the ranging time during which the ranging is being performed, and when sending signals from the Optical Line Terminal to the terminals via the Optical Network Terminal; the Optical Network Terminal receives the packets storing plural and x number of time-division multiplexed signals, and disassembles the x number of time-divided signals stored in each packet into x number of frames, and transmits the frames to the terminals.

11. An Optical Network Terminal according to claim 10, wherein the packets contain a GEM header of G-PON (Generic Passive Optical Network) and consecutive x number of time-division multiplexed signals following the GEM header.

12. An Optical Network Terminal according to claim 10, wherein the x is any one among 3, 4, 6, or 8.

13. An Optical Network Terminal according to claim 10, wherein the packet contains multiple structural units when one structural unit contains a GEM header of G-PON (Generic Passive Optical Network) and the consecutive x number of time-division multiplexed signals following the GEM header.

14. An Optical Network Terminal according to claim 13, wherein the packet contains a flag for notifying the Optical Network Terminal of an increase or decrease in the number of time-division multiplexed signals in the packet.

15. An Optical Line Terminal connected to a network, and also connected to multiple user terminals via multiple Optical Network Terminals; including an interface for sending/receiving time-division multiplexed signals and packet multiplexed signals, and an interface for multiplexing the time-division multiplexed signals and packet multiplexed signals and sending/receiving the multiplexed signals and communicating with the Optical Network Terminals by using first periodic frames and performing a ranging for measuring a distance from the Optical Network Terminals, wherein when sending signals from the Optical Line Terminal to one of the Optical Network Terminals, the Optical Line Terminal transmits the time-division multiplexed signals with second periodic frames each period of which being longer than the period of the first periodic frame and containing a fixed number of the first periodic frames transmitted from the Optical Line Terminal to one of the user terminals, and transmission of the second periodic frames is scheduled so that the timing is not overlapped with a ranging time during which the ranging is being performed.

16. An Optical Line Terminal according to claim 15, wherein the period of the second periodic frame is a multiple of a 1 millisecond constant.

17. An Optical Line Terminal according to claim 15, wherein when sending signals from the Optical Network Terminals tot the network via the Optical Line Terminal; the Optical Line Terminal receives packets storing plural and x number of time-division multiplexed signals transmitted from the Optical Line Terminal to one of the user terminals, and disassembles the x number of time-divided signals stored in each packet into x number of frames, and transmits the frames to the network, and when sending signals from the Optical Line Terminal to the terminals via the Optical Network Terminals; the Optical Line Terminal makes the packets storing plural and x number of time-division multiplexed signals, and transmits the packets each x number of time-divided periods, moreover, the transmissions of the packets are scheduled so that the timing is not overlapped with the ranging time during which the ranging is being performed.

18. An Optical Line Terminal according to claim 17, wherein the packets contain a GEM header of G-PON (Generic Passive Optical Network) and consecutive x number of time-division multiplexed signals following the GEM header.

19. An Optical Line Terminal according to claim 17, wherein the x is any one among 3, 4, 6, or 8.

20. An optical line terminal Optical Line Terminal according to claim 17, wherein the packet contains multiple structural units when one structural unit contains a GEM header of G-PON (Generic Passive Optical Network) and the consecutive x number of time-division multiplexed signals following the GEM header.

21. An Optical Line Terminal according to claim 20, wherein the packet contains a flag for notifying the Optical Network Terminal of an increase or decrease in the number of time-division multiplexed signals in the packet.

* * * * *